(12) United States Patent
Tudose

(10) Patent No.: US 8,139,088 B2
(45) Date of Patent: Mar. 20, 2012

(54) METHOD FOR GENERATING A DIGITAL MAP

(75) Inventor: Radu Tudose, Würzburg (DE)

(73) Assignee: Garmin Würzburg GmbH (DE)

( * ) Notice: Subject to any disclaimer, the term of this patent is extended or adjusted under 35 U.S.C. 154(b) by 728 days.

(21) Appl. No.: 12/329,758

(22) Filed: Dec. 8, 2008

(65) Prior Publication Data

US 2009/0153563 A1 Jun. 18, 2009

(30) Foreign Application Priority Data

Dec. 18, 2007 (DE) .......................... 10 2007 061 657

(51) Int. Cl.
*G09G 5/00* (2006.01)
*G01C 21/32* (2006.01)

(52) U.S. Cl. ........................ 345/636; 701/212

(58) Field of Classification Search .................. 345/636, 345/629; 701/212
See application file for complete search history.

(56) References Cited

U.S. PATENT DOCUMENTS

| | | | |
|---|---|---|---|
| 6,091,424 A | 7/2000 | Madden et al. | |
| 6,565,610 B1 * | 5/2003 | Wang et al. | 715/210 |
| 7,076,505 B2 * | 7/2006 | Campbell | 1/1 |
| 7,942,762 B2 * | 5/2011 | Balardeta et al. | 473/407 |
| 2006/0058949 A1 | 3/2006 | Fogel et al. | |

* cited by examiner

*Primary Examiner* — Ryan R Yang
(74) *Attorney, Agent, or Firm* — Samuel M. Korte

(57) ABSTRACT

A method for generating a digital map that can be stored on an electronic storage medium and in which a geographic area is described by a multitude of data sets includes the following steps:

a) loading a database, in which the geographic area is described by a multitude of data sets, into an electronic analyzer, wherein the data sets contain several text data sets that describe the text messages (03), particularly street names, to be displayed in the map, b) specifying a resolution for the graphic illustration of at least a section of the digital map with assigned text messages (03) to be displayed on a display unit, c) calculating graphic overlaps (07) of the text messages (03) during the display of the section of the digital map on the display unit in dependence on the specified resolution, d) identifying all text messages (03) that cause graphic overlaps (07), and e) storing text display attributes that are assigned to the text data sets, wherein the text display attributes contain information on which text messages (03) are not displayed in the graphic illustration of the digital map at a specified resolution in order to prevent overlaps (07).

21 Claims, 2 Drawing Sheets

METHOD FOR GENERATING A DIGITAL MAP

CROSS-REFERENCE TO RELATED APPLICATION

This application claims the priority benefit of German Patent Application No. 10 2007 061 657.2 filed on Dec. 18, 2007, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention pertains to a method for generating a digital map that can be stored on an electronic storage medium and in which a geographic area is described by a multitude of data sets.

BACKGROUND OF THE INVENTION

Digital maps are used, in particular, but by no means exclusively, for the operation of navigation devices. In digital maps that can be used in navigation devices, it is also possible to graphically illustrate text messages such as, in particular, street names in addition to the geographic area. In order to illustrate the changes of position on the display unit of a navigation device in real-time while the navigation device is in motion, the limited computing capacity of navigation devices makes it necessary to pre-process the data of the digital maps in such a way that the least computing capacity possible is required during the operation.

In generic methods for generating digital maps, fixed positions are assigned to the text messages in a pre-processing step such that the text messages are always illustrated in the digital map at the same geographic position and it is no longer necessary to calculate the positions for the illustration of text messages during the operation.

The disadvantage of this prior art can be seen in that the text messages may overlap. Consequently, a certain degree of computing capacity is once again required in order to eliminate overlaps or to decide which text messages should be displayed. The calculation of the overlaps during the operation of a navigation device may result in one and the same text message consistently disappearing and reappearing on the display unit of the navigation device within very short intervals or in the computer unit of the navigation device being overloaded and thusly causing a stagnant illustration on the display unit.

SUMMARY OF THE INVENTION

Based on this prior art, the present invention provides an improved method for generating digital maps that minimizes the time and the computing capacity for the graphic illustration of text messages in digital maps.

The inventive method assigns a text display attribute to the text data sets of the digital map, wherein this text display attribute contains information on which text message is displayed in the graphic illustration of the map. For this purpose, the data sets that describe the geographic area of the map are loaded into an electronic analyzer in a first step of the method in order to realize the pre-processing. Since the overlaps of text messages in the graphic illustration of the digital map are dependent on the resolution of the display, the resolution of the graphic illustration used for displaying at least a section of the digital map and the text messages contained therein is specified in a second step of the method. In the next step of the method, the overlaps of text messages that are created if at least a section of the digital map is displayed on a display unit at the resolution specified in the preceding step are calculated. After the calculation of the overlaps, the text messages that are involved in at least one overlap are identified in another step of the method in order to ultimately assign text display attributes to the text data sets and store these text display attributes in a last step of the method, wherein these text display attributes contain information on which text messages are not displayed in the graphic illustration of the digital map at a specified resolution in order to prevent overlaps.

In order to display the digital map on a display unit with several different resolutions, it is particularly sensible to carry out the second and third step of the method several times in succession for different resolutions and to assign to the text data sets a limiting resolution value as a text display attribute and to store the same, wherein this limiting resolution value specifies up to which resolution of the graphic illustration a text message is displayed. This allows a very effective pre-processing of the text data sets because it is possible, for example, to store the text data sets such that they are sorted in accordance with this text display attribute after the storage of the display limiting values, and thus the reading out of the text messages to be displayed is extremely simplified for any possible resolution of the graphic illustration.

Since fewer text messages are displayed, in principle, at a higher resolution, it is obvious that a graphic illustration with a high resolution results in fewer overlaps of text messages than a graphic illustration with a lower resolution. According to one advantageous variation of the inventive method, it is therefore proposed to carry out the second and the third step of the method in succession for several resolutions of the graphic illustration, wherein this process begins with the highest resolution and the resolution is then incrementally lowered in order to ultimately assign to the text data sets a text display attribute in the form of a display limiting value that controls the display of each text data set at the different resolutions. This process is typically carried out until a specified limiting resolution is reached, beyond which street names can no longer be displayed at all. The method can be carried out separately for highway numbers (A3, B112, . . . )

In order to realize a diverse and advantageous graphic illustration of the digital map on a display unit, it is particularly desirable to change between several display modes, wherein it is proposed to store at least two different text display attributes that are respectively assigned to one display mode in the text data sets in order to utilize the advantages of the inventive method in each display mode. Consequently, the advantages of the inventive method can be realized in several or all display modes provided for the illustration of the digital map with only very little additional storage space.

The different display modes may basically be configured in any way. However, it has proved particularly advantageous to assign the first text display attribute to a display mode for the graphic illustration of a digital map with a fixed angular orientation of the map to be illustrated on the display unit and to assign the second text display attribute to a display mode for the graphic illustration of a digital map with a variable angular orientation of the map to be illustrated on the display unit.

The best resemblance possible to a classical map and thusly an improved legibility are achieved by displaying the display mode with the fixed angular orientation of the digital map on the display unit, to which the first text display attribute is assigned, in such a way on the display unit that the north-south direction extends from the upper edge to the lower edge of the display unit.

With respect to the illustration of the digital map on the display unit of a navigation device in motion, it is furthermore advantageous to realize a display mode, in which the current moving direction, particularly the driving direction, extends from the upper edge to the lower edge of the display unit. This allows a particularly intuitive orientation, especially with respect to turning maneuvers.

One advantageous variation of the inventive method is in which a display field is assigned to each text data set, wherein the size of the display field is defined by the ability to illustrate the text message.

If the digital map is graphically illustrated in the second above-described display mode, one encounters the problem that, beginning at a certain angular orientation, certain text messages are illustrated relative to the normal writing direction at an angle at which it is no longer possible to readily read the text message. With respect to the graphic illustration of the digital map in a display mode with a variable angular orientation on a display unit, it is therefore particularly sensible to assign two display fields to each text data set, wherein said display fields are positioned in such a way that the text messages are respectively displayed either in the first display field or in the second display field with respectively reversed orientation depending on the current angle of orientation of the digital map. Consequently, each text message is angled by no more than ±90° relative to the horizontal text orientation in the second display mode such that each displayed text message can always be read.

A particularly simple management of the display fields is achieved if the display fields consist of rectangles, the height of which is adapted to the font size of the text to be displayed and the length of which is adapted to the length of the text to be displayed. These properties make it possible to easily process the display fields by electronic analyzers.

Since display fields that can be very easily processed by the analyzer are used rather than the outlines of the actual text messages, data sets with overlapping text messages can be very easily calculated and identified in accordance with the third and fourth step of the method because it is merely required to calculate the overlaps of the display fields assigned to the individual text messages.

The quality of the graphic illustration of the digital map decisively depends on the information content created by the text messages. In order to maximize the information content, it is therefore sensible to carry out the identification of the text messages that are no longer displayed from a certain resolution on in order to prevent graphic overlaps, as well as the associated assignment and storage of text display attributes in the form of display limiting values, in dependence on specified prioritization rules. These prioritization rules make it possible to determine beforehand how the information content of the individual text message needs to be evaluated.

The aforementioned prioritization rules may essentially be configured in any suitable way. However, it is particularly sensible to evaluate the function class of streets, the name or designation of which should be displayed as text message and overlap with at least one other text message, as a first prioritization rule of text messages.

It is naturally possible that no prioritization occurs for two or more text messages on the basis of a first prioritization rule such that the identification of text messages that should no longer be displayed from a certain resolution cannot be realized on the basis of one prioritization rule. In such instances, it is advantageous to apply additional prioritization rules until a prioritization of a text message that overlaps with at least one other text message can be established. With respect to a second prioritization rule, it is advantageous to evaluate the street category of streets within a function class in order to classify text messages.

In case another prioritization rule is required in order to identify text messages that should no longer be displayed from a certain resolution on, it has proved particularly sensible to evaluate the text messages with respect to the length of the street name because it is much more probable, for example, that an exceptionally long street name causes a number of overlaps with other text messages. If a particularly long text message is no longer displayed, this would make it possible, in the best-case scenario, to display a multitude of other text messages and to increase the information content of the graphic illustration of the digital map.

In another advantageous variation, the database established with the inventive method is stored in a main memory or mass memory. This ensures fast access to and a permanent storage of the data sets.

The inventive method is particularly suitable for the pre-processing of data for the graphic illustration of a geographic area by means of a navigation device. It is therefore advantageous to install the electronic analyzer for generating the digital map in the navigation device, and to store the data sets on a main memory or mass memory that also forms part of the navigation device.

In order to update the information of the digital map and/or to allow the utilization of several different digital maps of different geographic areas, it is advantageous to connect the storage medium to the navigation device in an exchangeable manner. According to another advantageous variation, the mass memory or main memory therefore is realized in the form of a fixed disk, a CD-ROM or a memory card.

The digital map can be continuously and rapidly updated if the storage medium, particularly the mass memory or the main memory, and the analyzer are installed on a server outside the navigation device and the database of the digital map is transmitted to the navigation device by means of remote data transmission. This variation provides the additional advantages that the pre-processing requires absolutely no computing capacity of the navigation device and that a number of navigation devices can access the digital map.

In another advantageous variation, several text data sets of the database of the digital map are read out and additionally processed by an image generator in order to create a graphic illustration of a map on a display unit of a terminal, particularly a navigation device. After the pre-processing in accordance with the inventive method the text data sets and the assigned text display attributes are read out and additionally processed with a minimum expenditure of time and computing capacity.

The invention furthermore pertains to a navigation device with a memory, in which a digital map for describing a geographic area is stored. In this case, a database that has been established with the inventive method is stored in the memory.

Different aspects of the inventive method are schematically illustrated in the drawings and are described in an exemplary fashion below.

DETAILED DESCRIPTION OF THE EXAMPLE EMBODIMENTS

Figure 1:
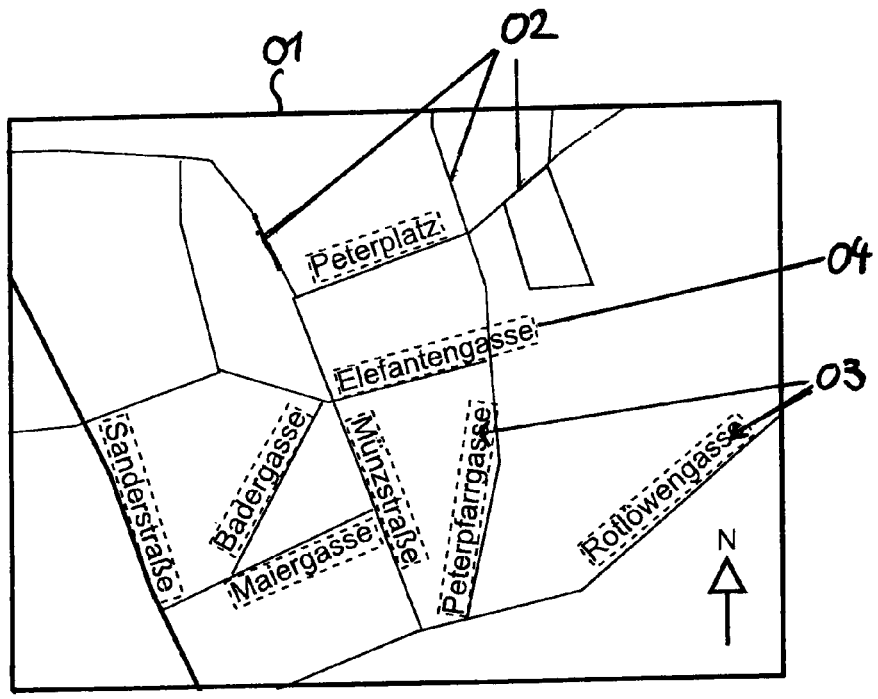
FIG. 1 shows a schematic detail of a map with several text messages after the assignment of text display attributes for the first display mode.

FIG. 1 shows an exemplary detail of a map 01 with a certain resolution and a very low detail level. The displayed map contains several streets 02, some of which are provided with a text message 03 that contains the street name. In this case, each street name is enclosed in a display field 04, the dimensions of which are indicated by rectangles drawn with broken lines. The display fields 04 of the text messages 03 being displayed do not overlap. Consequently, the limiting resolution value does not have to be set to the displayed resolution for any of the illustrated text messages 03. With respect to the streets that are not provided with a text message 03, it was determined by means of the inventive method that at least one overlap with other text messages 03 would occur and the display of the respective text message was suppressed for the specified resolution. These streets have been assigned a limiting resolution value as a text display attribute that corresponds to a resolution that is at least one increment higher than the displayed resolution and at which no overlaps with other text messages 03 occur. Consequently, FIG. 1 shows the result of the inventive method for a small portion of a digital map 01 at a specified resolution.

Figure 2:
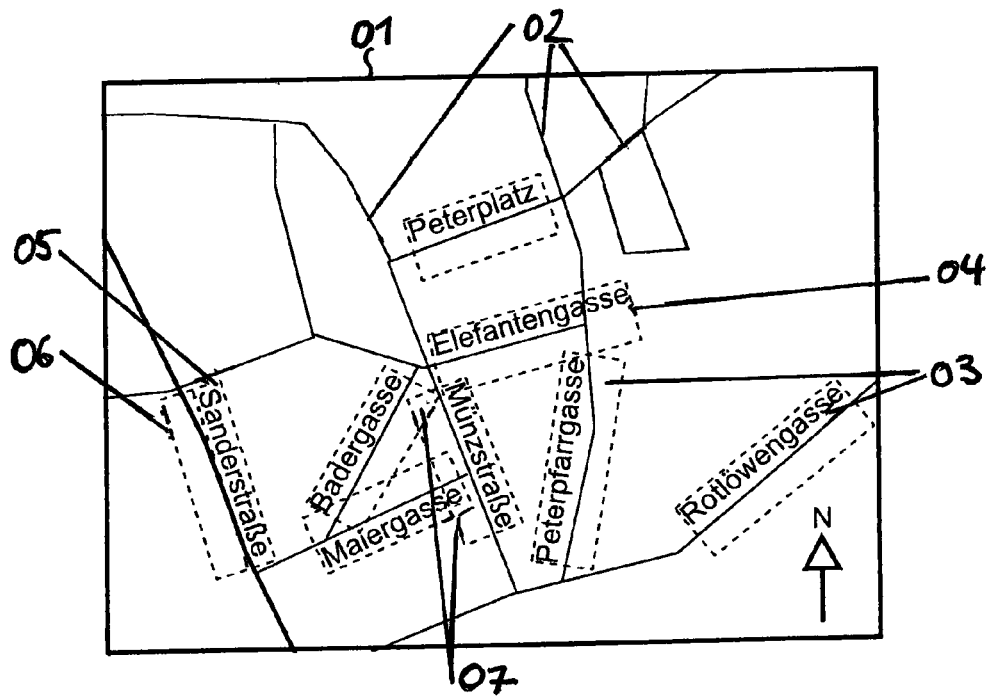
FIG. 2 shows a schematic detail of a map with several text messages prior to the assignment of text display attributes for the second display mode.

FIG. 2 shows the same detail of a map 01 as FIG. 1 at the same resolution. This figure shows the situation before the inventive method is carried out for the second display mode, namely a map in which the current driving direction extends from the upper edge to the lower edge of the map on the display unit of a navigation device. This map contains the text messages 03 that, according to the inventive method, are displayed at the specified resolution for the first display mode. The display fields 04 of the text messages 03 consist of a combination of a first display field 05 and a second display field 06. Several overlaps 07 of display fields 04 are visible in this figure. For example, the display field 04 of "Badergasse" overlaps with the display field 04 of "Münzstrasse." The inventive method therefore is used for determining which of the text messages are displayed at the specified resolution in the second display mode. This is realized on the basis of prioritization rules for analyzing the text messages 03, the display fields 04 of which overlap one another, based on specified criteria such as, for example, the function class of the street, the street category, the length of the street name, the length of the street and/or the number of street segments. Ultimately, a text display attribute is stored with the text data set, wherein said text display attribute decides on the display of the text message at a specified resolution.

Figure 3:
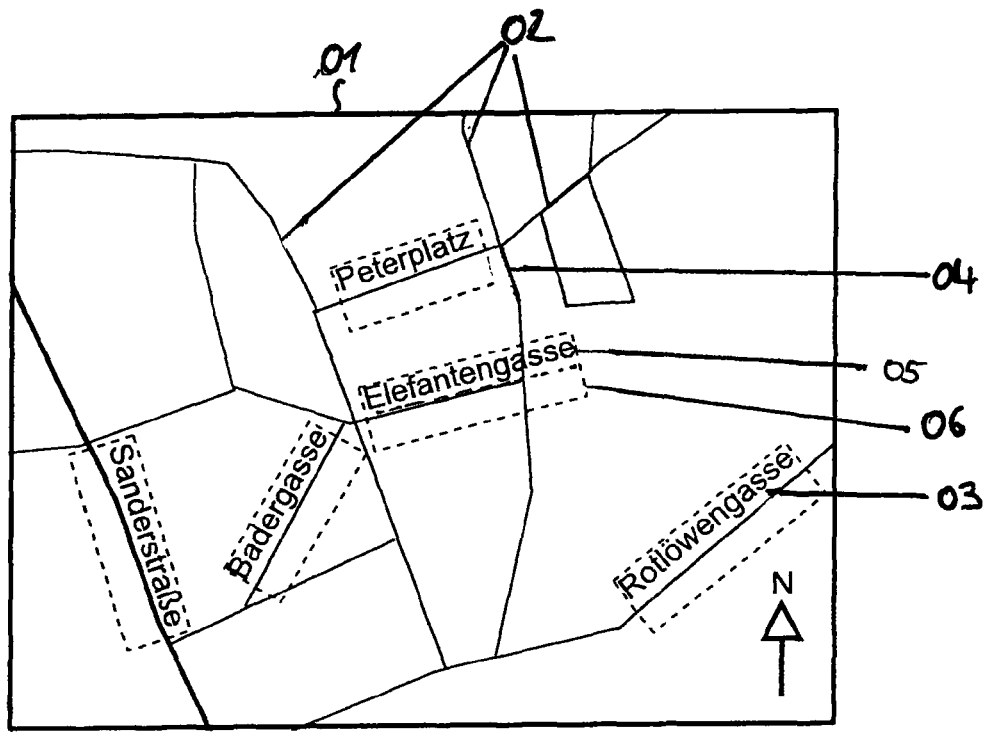
FIG. 3 shows a schematic detail of a map with several text messages after the assignment of text display attributes for the second display mode.

FIG. 3 shows the result of the inventive method for the situation illustrated in FIG. 2. The number of text messages 03 is noticeably reduced in comparison with FIG. 2 and no additional overlaps occur. The text messages that were displayed in FIG. 2, but are no longer illustrated in this figure, have been assigned a limiting resolution value as a text display attribute that blocks the display of the text message 03 for the second display mode at the specified resolution.

Figure 4:
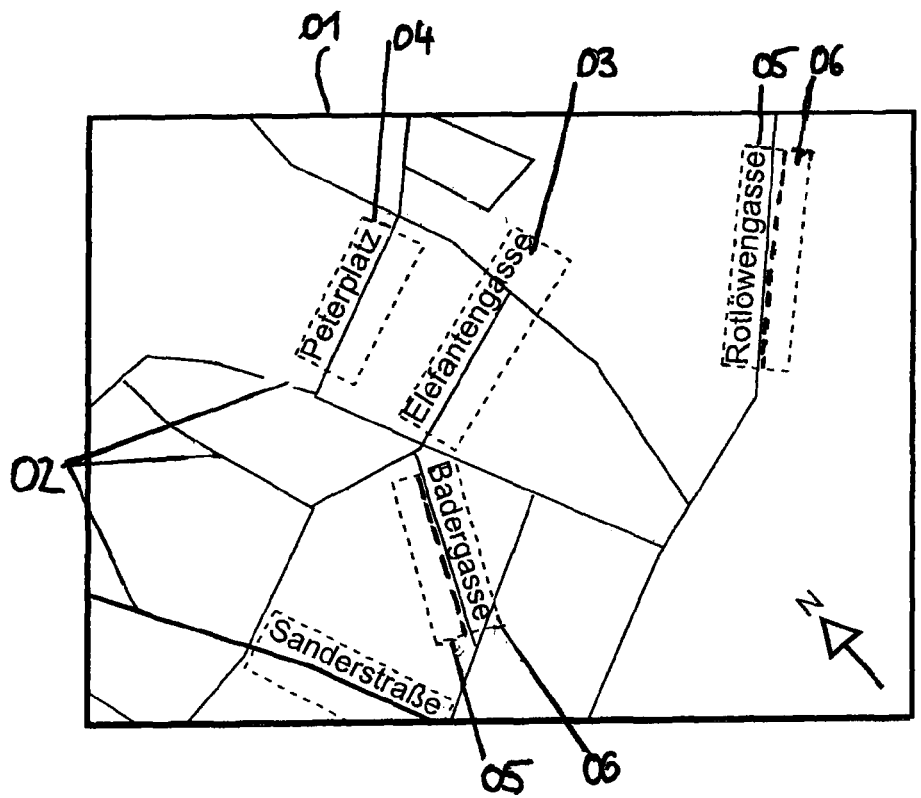
FIG. 4 shows a schematic detail of a map with several text messages that corresponds to an illustration of the second display mode on a display unit.

FIG. 4 shows a detail of a map 01 that results after turning the map section illustrated in FIG. 3 and elucidates the importance of utilizing at least two respective display fields 04 per text message 03 in the second display mode. In FIG. 4, the detail of the map 01 represents a schematic illustration of a digital map on the display unit of a navigation device, in which the second above-described display mode is activated. If only one display field 04 were used per text message 03 as it is the case, for example, in FIG. 1, the text message "Badergasse" would, after turning the map section into the position shown in FIG. 4, be displayed at such an angle that it would be very difficult to read the text message 03. Due to the utilization of the second display field 06, however, the text message 03 is displayed in a mirrored fashion in the second display field 06 if the aforementioned angle exceeds ±90° such that the legibility of the text message is preserved. Since both display fields 05 and 06 of a text message 03 are used for determining overlaps, no overlap with another text message 03 occurs after mirroring and displaying the text message 03 in the second display field 06.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

The invention claimed is:

1. A method for generating a digital map that can be stored on an electronic storage medium and in which a geographic area is described by a multitude of data sets, comprising the following steps:
   a) loading a database, in which the geographic area is described by a multitude of data sets, into an electronic analyzer, wherein the data sets contain several text data sets that describe text messages (03), particularly street names, to be displayed in the map,
   b) specifying a resolution for the graphic illustration of at least one section of the digital map with assigned text messages (03) to be displayed on a display unit,
   c) calculating graphic overlaps (07) of the text messages (03) during the display of the section of the digital map on the display unit in dependence on the specified resolution,
   d) identifying all text messages (03) that cause graphic overlaps (07), and
   e) storing text display attributes that are assigned to the text data sets, wherein the text display attributes contain information on which text messages (03) are not displayed in the graphic illustration of the digital map at a specified resolution in order to prevent overlaps (07).

2. The method according to claim 1, in which steps b) and c) are carried out in succession for several resolutions of the graphic illustration of the digital map, wherein limiting resolution values are stored as text display attributes, and wherein a text message (03) of a text data set is not displayed in the graphic illustration of the digital map if the current resolution of the graphic illustration is lower or lower than or equal to the limiting resolution value stored in the text data set.

3. The method according to claim 2, in which steps b) and c) are carried out in succession for several resolutions of the graphic illustration of the digital map, wherein this process begins with the highest resolution and the resolution is incrementally lowered.

4. The method according to claim 1, in which at least two different text display attributes are calculated and stored for the respective text data sets, wherein the different text display attributes are respectively assigned to one display mode.

5. The method according to claim 4, in which a first text display attribute is assigned to a first display mode for the graphic illustration of the digital map, in which the map is displayed on the display unit with fixed angular orientation, wherein a second text display attribute is assigned to a second display mode for the graphic illustration of the digital map, in which the map is displayed on the display unit with variable angular orientation.

6. The method according to claim 5, in which in the first display mode the digital map is graphically illustrated in such a way that the north-south direction extends from the upper edge to the lower edge of the display unit and the west-east direction extends from the left edge to the right edge of the display unit.

7. The method according to claim 5, in which in the second display mode the digital map is graphically illustrated in such a way that the current driving direction extends from the upper edge to the lower edge of the display unit.

8. The method according to claim 1, in which at least one display field (04) is assigned to each text data set, wherein the size of said display field is defined by the ability to display the text message.

9. The method according to claim 1, in which two display fields (05, 06) are assigned to each text data set, wherein in the second display mode the text messages are displayed in the graphic illustration of the digital map either in the first display field (05) or in the second display field (06) with respectively reversed orientation depending on the current angle of orientation.

10. The method according to claim 8, in which the display fields (04) have a rectangular shape, wherein the length of the display fields (04) is respectively adapted to the length of the text message (03) to be displayed, and wherein the height of the display fields (04) is respectively adapted to the front size of the text message (03) to be displayed.

11. The method according to claim 8, in which the calculation and identification of graphic overlaps (07) between two text messages (03) is realized in steps b) and c) by calculating and identifying the overlaps (07) between the display fields (04) assigned to the two text messages (03).

12. The method according to claim 1, in which in step c) the identification of text messages (03) that are not displayed at a certain resolution in order to prevent graphic overlaps (07) is carried out in dependence on specified prioritization rules.

13. The method according to claim 12, in which a first prioritization rule is provided for the identification of text messages (03), in which the function class of streets the street name or designation of which should be displayed as text message (03) is evaluated.

14. The method according to claim 12, in which a second prioritization rule is provided for the identification of text messages (03), in which the street category of streets within a function class is evaluated.

15. The method according to claim 12, in which a third prioritization rule is provided for the identification of text messages (03), in which the length of the text messages (03), particularly the length of street names, is evaluated.

16. The method according to claim 1, in which the database is stored in a mass memory or main memory.

17. The method according to claim 16, in which the mass memory or main memory forms part of the navigation device, wherein the data sets are analyzed with an analyzer installed in the navigation device.

18. The method according to claim 16, in which the mass memory or main memory is realized in the form of a fixed disk, a CD-ROM or a memory card.

19. The method according to claim 16, in which the mass memory is installed on a server outside the navigation device, wherein the data sets are analyzed with an analyzer installed on the server, and wherein the database of the digital map is transmitted to the navigation device by means of remote data transmission.

20. The method according to claim 1, in which several text data sets of the database of the digital map are read out and additionally processed by an image generator in order to generate a graphic illustration of a map on a display unit of a terminal, particularly a navigation device.

21. A navigation device with a memory, in which a digital map for describing a geographic area is stored, in which a database established with a method according to claim 1 is stored in the memory.

* * * * *